US011432296B2

(12) United States Patent
Bai et al.

(10) Patent No.: US 11,432,296 B2
(45) Date of Patent: Aug. 30, 2022

(54) INDICATION OF COMMON BEAM FOR MULTIPLE USER EQUIPMENTS

(71) Applicant: QUALCOMM Incorporated, San Diego, CA (US)

(72) Inventors: Tianyang Bai, Somerville, NJ (US); Yan Zhou, San Diego, CA (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 17/034,174

(22) Filed: Sep. 28, 2020

(65) Prior Publication Data

US 2021/0185686 A1 Jun. 17, 2021

Related U.S. Application Data

(60) Provisional application No. 62/949,372, filed on Dec. 17, 2019.

(51) Int. Cl.
| | |
|---|---|
| H04W 72/04 | (2009.01) |
| H04W 76/27 | (2018.01) |
| H04W 80/02 | (2009.01) |
| H04L 25/02 | (2006.01) |
| H04L 5/00 | (2006.01) |
| H04W 74/08 | (2009.01) |
| H04W 76/11 | (2018.01) |
| H04B 7/06 | (2006.01) |
| H04W 4/06 | (2009.01) |

(52) U.S. Cl.
CPC ...... *H04W 72/0493* (2013.01); *H04B 7/0626* (2013.01); *H04L 5/0051* (2013.01); *H04L 25/0226* (2013.01); *H04W 4/06* (2013.01); *H04W 72/042* (2013.01); *H04W 72/046* (2013.01); *H04W 72/0453* (2013.01); *H04W 72/0466* (2013.01); *H04W 74/0833* (2013.01); *H04W 76/11* (2018.02); *H04W 76/27* (2018.02); *H04W 80/02* (2013.01); *H04L 5/001* (2013.01)

(58) Field of Classification Search
CPC . H04B 7/0626; H04L 5/0051; H04L 25/0226; H04W 72/042; H04W 72/0453; H04W 72/046; H04W 72/0466; H04W 76/27
See application file for complete search history.

(56) References Cited

U.S. PATENT DOCUMENTS

| | | | |
|---|---|---|---|
| 2016/0323129 A1* | 11/2016 | Wang | H04W 76/14 |
| 2018/0191417 A1* | 7/2018 | Kim | H04B 7/0617 |
| 2019/0109695 A1* | 4/2019 | Kim | H04L 5/0051 |

(Continued)

*Primary Examiner* — Fahmida S Chowdhury
(74) *Attorney, Agent, or Firm* — Patterson & Sheridan, LLP

(57) ABSTRACT

Certain aspects of the present disclosure relate to methods and apparatus for sending an indication of a common beam for communicating between a network entity and a group of user equipments (UEs). A method that may be performed by a UE generally includes receiving, from a network entity, an indication of a common beam for communicating between the network entity and a group of UEs that includes the UE. The method generally includes communicating with the network using the common beam.

31 Claims, 13 Drawing Sheets

(56) References Cited

U.S. PATENT DOCUMENTS

| | | | |
|---|---|---|---|
| 2019/0297602 A1* | 9/2019 | You | H04W 72/042 |
| 2019/0335431 A1* | 10/2019 | Wang | H04L 1/0041 |
| 2019/0342061 A1* | 11/2019 | Kim | H04W 72/0473 |
| 2020/0404482 A1* | 12/2020 | Xu | H04W 4/08 |
| 2021/0185647 A1* | 6/2021 | Rahman | H04L 5/0053 |
| 2021/0307003 A1* | 9/2021 | Chou | H04L 5/0053 |
| 2022/0060243 A1* | 2/2022 | Keating | H04B 7/0408 |

* cited by examiner

700

| Source RS | Target RS | QCL Type |
|---|---|---|
| P-TRS | AP-TRS | Type-A/D |
| SSB | P-TRS | Type-C/D |
| P-TRS | PDCCH | Type-A/D |
| P-TRS | PDSCH | Type-A/D |
| SSB | P-TRS | Type-C/D |
| SSB<br>CSI-RS BM | P-TRS | Type-C<br>Type-D |

FIG. 7

INDICATION OF COMMON BEAM FOR MULTIPLE USER EQUIPMENTS

CROSS-REFERENCE TO RELATED APPLICATION(S)

This application claims benefit of and priority to U.S. Provisional Application No. 62/949,372, filed Dec. 17, 2019, which is hereby assigned to the assignee hereof and hereby expressly incorporated by reference herein in its entirety as if fully set forth below and for all applicable purposes.

FIELD OF THE DISCLOSURE

The present disclosure relates generally to communication systems, and more particularly, to methods and apparatus for sending an indication of a common beam for communicating between a network entity and a group of user equipments (UEs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment. The method generally includes receiving, from a network entity, an indication of a common beam for communicating between the network entity and a group of UEs that includes the UE. The method generally includes communicating with the network using the common beam.

Certain aspects provide a method for wireless communications by a network entity. The method generally includes sending, to a user equipment (UE), an indication of a common beam for communicating between the network entity and a group of UEs that includes the UE. The method generally includes communicating with the UE using the common beam.

Certain aspects provide an apparatus for wireless communications by a user equipment. The apparatus generally includes at least one processor and a memory coupled to the at least one processor. The memory generally includes code executable by the at least one processor to cause the apparatus to receive, from a network entity, an indication of a common beam for communicating between the network entity and a group of UEs that includes the UE. The memory generally includes code executable by the at least one processor to cause the apparatus to communicate with the network using the common beam.

Certain aspects provide an apparatus for wireless communications. The apparatus generally includes at least one processor and a memory coupled to the at least one processor. The memory generally includes code executable by the at least one processor to cause the apparatus to send, to a UE, an indication of a common beam for communicating between the network entity and a group of UEs that includes the UE. The memory generally includes code executable by the at least one processor to cause the apparatus to communicate with the UE using the common beam.

Certain aspects provide an apparatus for wireless communications. The apparatus generally includes means for receiving, from a network entity, an indication of a common beam for communicating between the network entity and a group of UEs that includes the apparatus. The apparatus generally includes means for communicating with the network using the common beam.

Certain aspects provide an apparatus for wireless communications. The apparatus generally includes means for sending, to a UE, an indication of a common beam for communicating between the network entity and a group of UEs that includes the UE. The apparatus generally includes means for communicating with the UE using the common beam.

Certain aspects provide a computer readable medium storing computer executing code thereon for wireless communications. The computer readable medium generally includes code for receiving, from a network entity, an indication of a common beam for communicating between the network entity and a group of UEs that includes the UE. The computer readable medium generally includes code for communicating with the network using the common beam.

Certain aspects provide a computer readable medium storing computer executing code thereon for wireless communications. The computer readable medium generally includes code sending, to a UE, an indication of a common beam for communicating between the network entity and a group of UEs that includes the UE. The computer readable medium generally includes code for communicating with the UE using the common beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 is a table illustrating example quasi-colocation (QCL) relationships between source and target reference signals, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
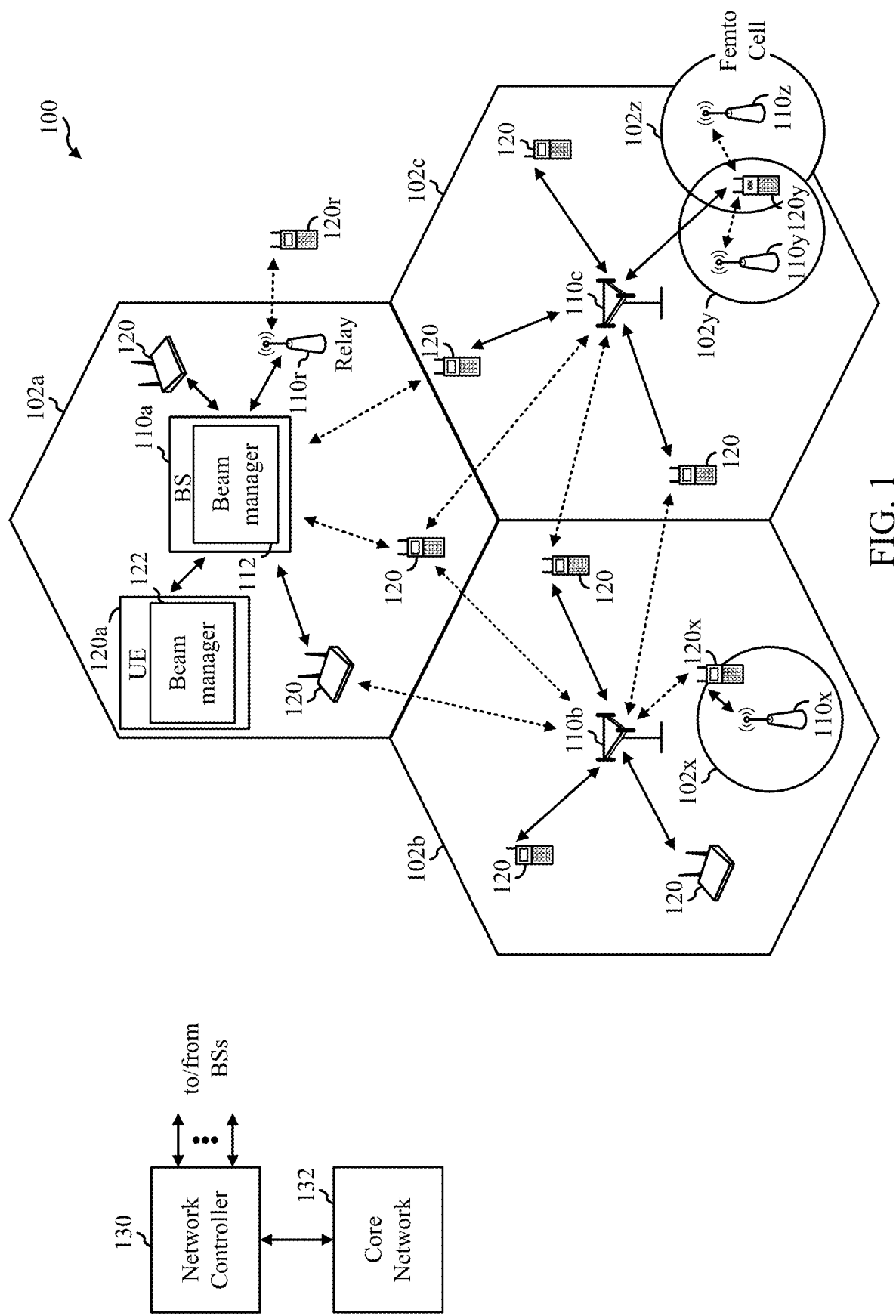
FIG. 1 is a block diagram conceptually illustrating an example telecommunications system, in which aspects of the present disclosure may be performed.

Aspects of the present disclosure provide mechanisms for sending an indication of a common beam for communicating between a network entity and a group of user equipments (UEs). The mechanisms may be applied for new radio (NR) (new radio access technology or 5G technology).

The network sends to each UE an update to the respective UE's transmission control information (TCI) state. The network may send the update in a unicast physical downlink shared channel (PDSCH) transmission. Some information in these unicast PDSCH transmission are identical to each other (or common to each other).

Accordingly, to reduce the overhead in each of the PDSCH transmissions, the network may send an indication of a common beam to be used for communicating with the UE. Communications using the common beam may include a beam update and/or TCI update.

The following description provides examples of common beam indication, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed. The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support multiple (e.g., up to 8) transmit antennas with multi-layer DL transmissions (e.g., up to 8 streams) and multiple (e.g., up to 2) streams per UE. Aggregation of multiple cells may be supported (e.g., up to 8 serving cells).

FIG. 1 illustrates an example wireless network 100, such as a new radio (NR) or 5G network, in which aspects of the present disclosure may be performed. As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

According to certain aspects, the BSs 110 and UEs 120 may be configured for communicating using a common beam between the BSs 110 and UEs 120 to reduce beam indication overhead. As shown in FIG. 1, the BS 110a includes a beam manager 112 that sends an indication of a common beam for communicating between the network entity and a group of UEs 120, and that communicates with the UE 120a using the common beam, in accordance with aspects of the present disclosure. The UE 120a includes a beam manager 122 that receives an indication of a common beam for communicating between the network entity and a group of UEs including the UE 120a, and that communicates with the BS 110a using the common beam, in accordance with aspects of the present disclosure.

A BS 110a may provide communication coverage for a particular geographic area, sometimes referred to as a "cell", which may be stationary or may move according to the location of a mobile base station. In some examples, the BSs 110 may be interconnected to one another and/or to one or more other BSs or network nodes (not shown) in the wireless network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
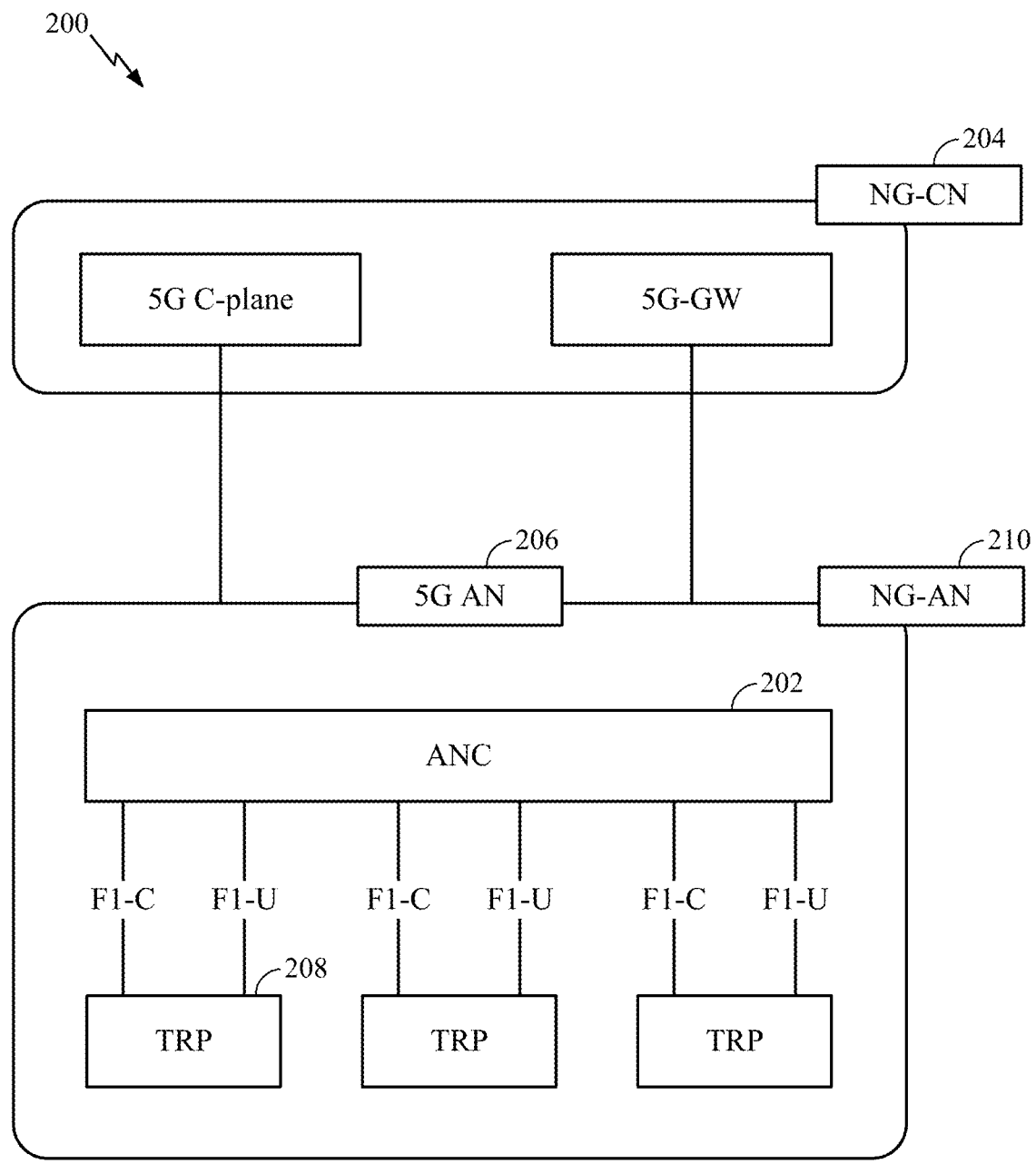
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
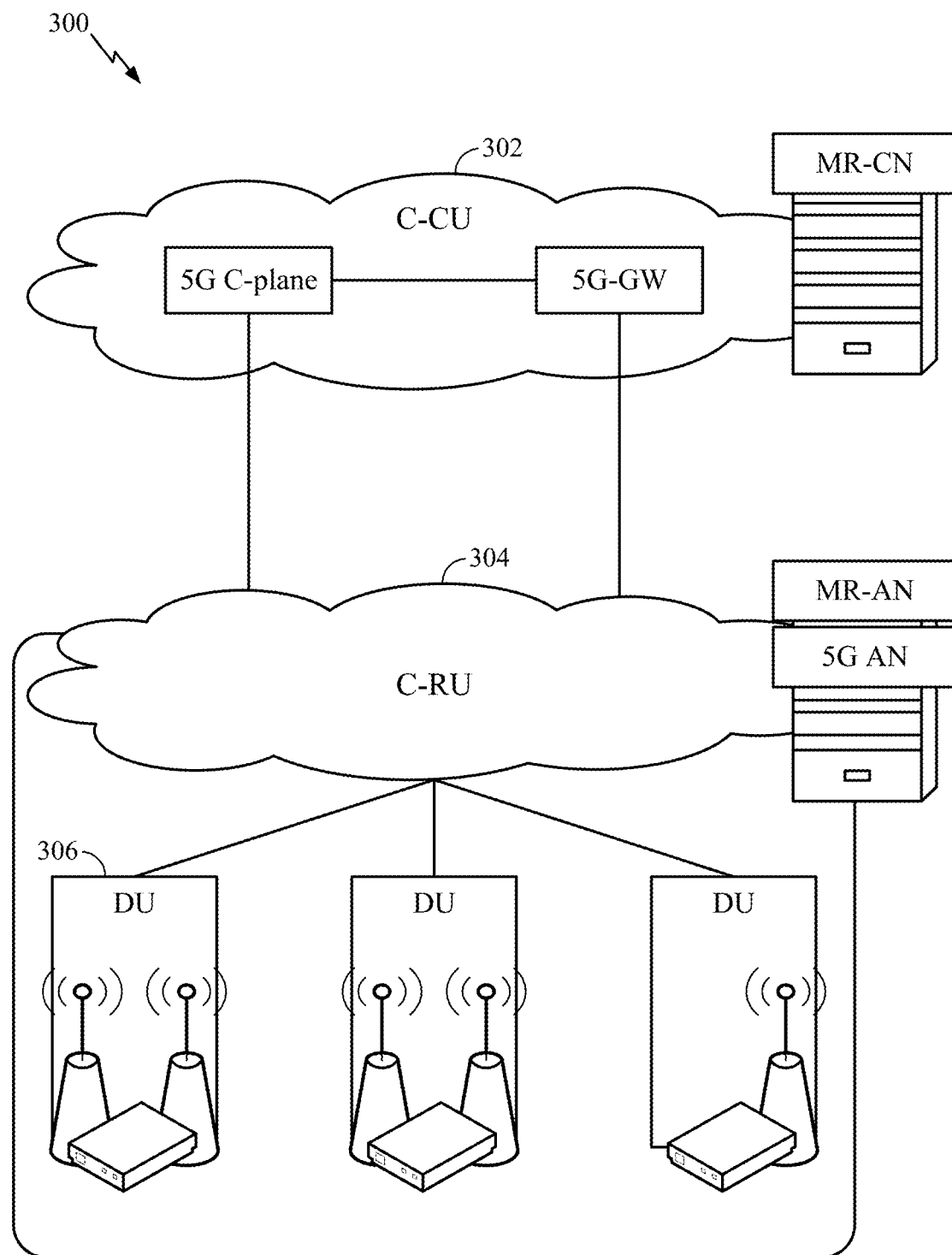
FIG. 3 is a diagram illustrating an example physical architecture of a distributed radio access network (RAN), in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
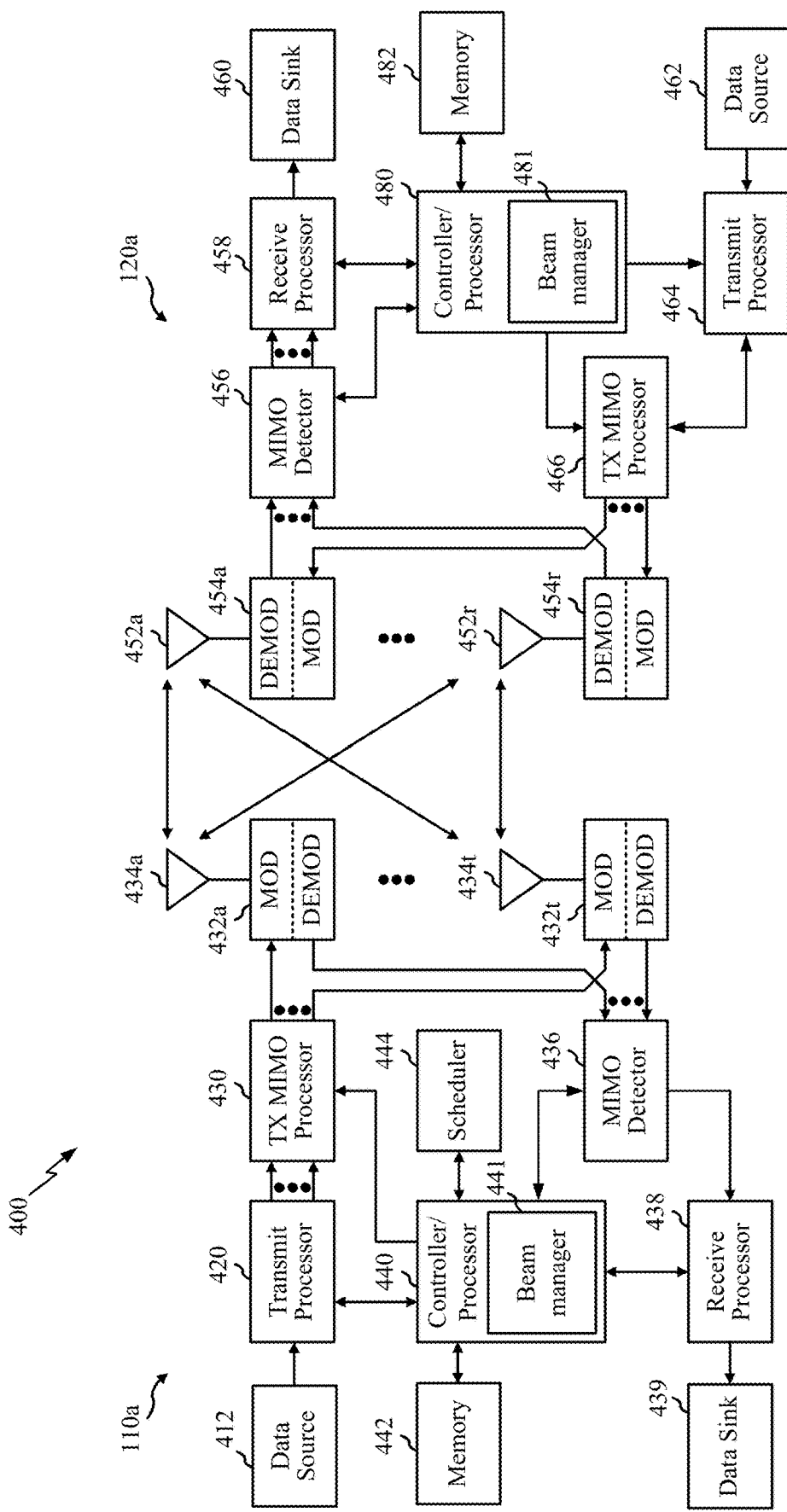
FIG. 4 is a block diagram conceptually illustrating a design of an example base station (BS) and user equipment (UE), in accordance with certain aspects of the present disclosure.

FIG. 4 illustrates example components of BS 110a and UE 120a (e.g., the wireless communication network 100 of FIG. 1), which may be used to implement aspects of the present disclosure.

At the BS 110a, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) in transceivers 432a-432t. Each modulator in transceivers 432a-432t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 432a-432t may be transmitted via the antennas 434a-434t, respectively.

At the UE 120a, the antennas 452a-452r may receive the downlink signals from the BS 110a and may provide received signals to the demodulators (DEMODs) in transceivers 454a-454r, respectively. Each demodulator in transceivers 454a-454r may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators in transceivers 454a-454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the modulators in transceivers 454a-454r (e.g., for SC-FDM, etc.), and transmitted to the BS 110a. At the BS 110a, the uplink signals from the UE 120a may be received by the antennas 434, processed by the demodulators in transceivers 432a-432t, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The memories 442 and 482 may store data and program codes for BS 110a and UE 120a, respectively. A scheduler 444 may schedule UEs for data transmission on the downlink and/or uplink.

Antennas 452, processors 466, 458, 464, and/or controller/processor 480 of the UE 120a and/or antennas 434, processors 420, 430, 438, and/or controller/processor 440 of the BS 110a may be used to perform the various techniques and methods described herein. For example, as shown in FIG. 2, the controller/processor 440 of the BS 110a has a beam manager 441 that sends an indication of a common beam for communication between the BS 110a and a group of UEs, including UE 120a, and that communicates with the UE 120a using the common beam, according to aspects described herein. As shown in FIG. 2, the controller/processor 480 of the UE 120a has a beam manager 481 that receives an indication of a common beam for communication between the BS 110*a* and a group of UEs, including UE 120*a*, and that communicates with the BS 110*a* using the common beam, according to aspects described herein. Although shown at the controller/processor, other components of the UE 120*a* and BS 110*a* may be used to perform the operations described herein.

Figure 5:
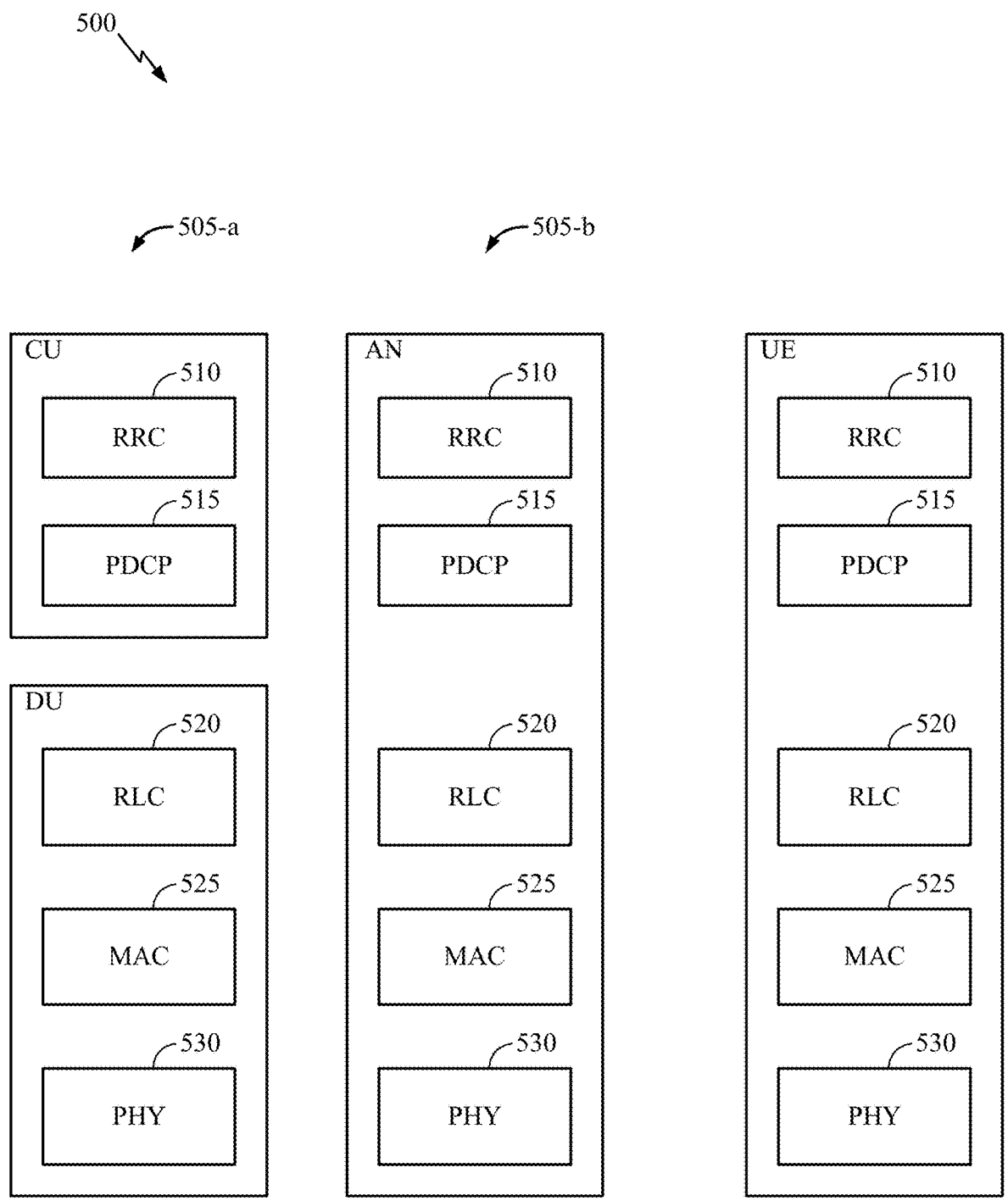
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 6:
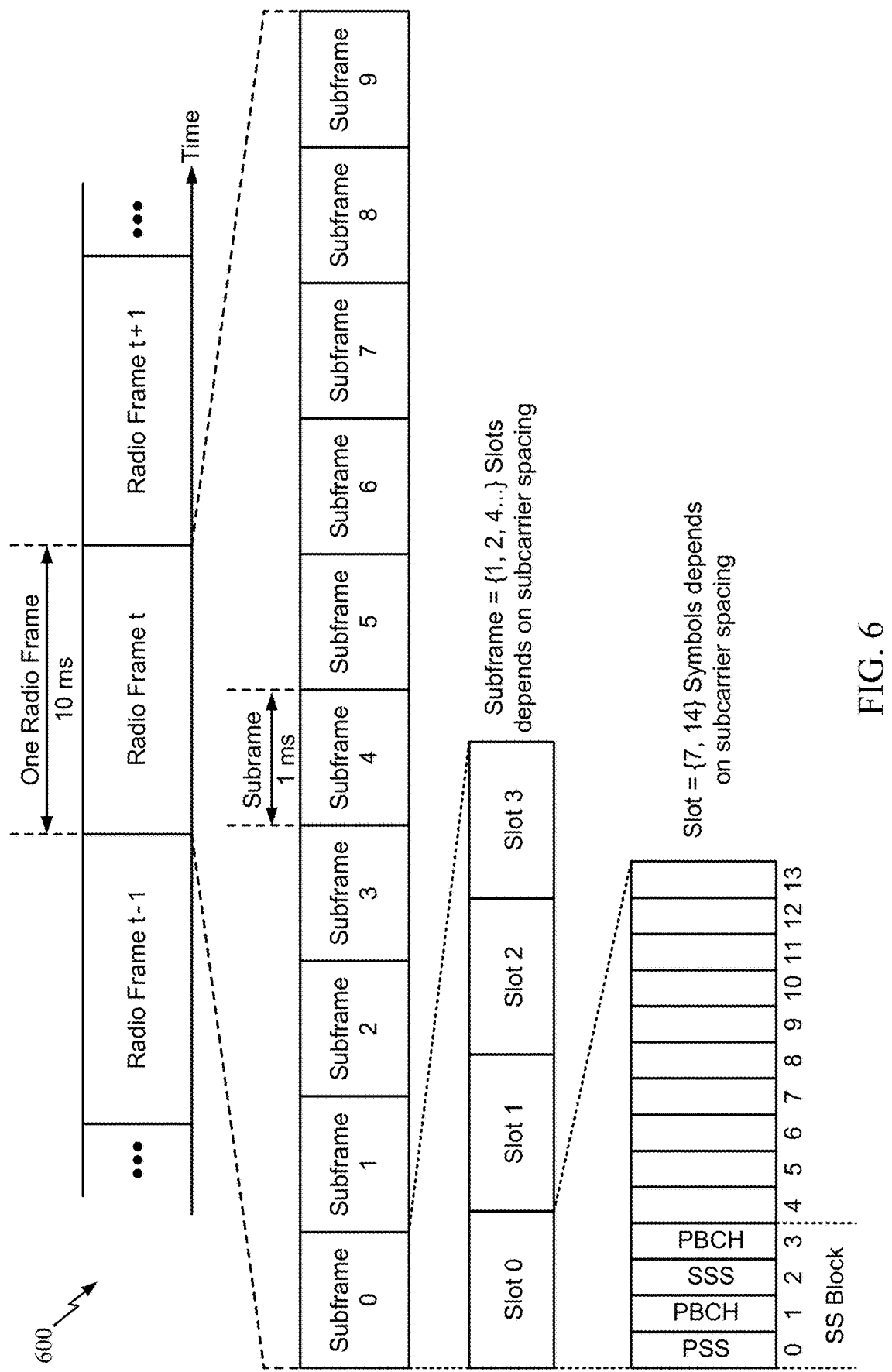
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In many cases, it is important for a user equipment (UE) to know which assumptions it can make on a channel corresponding to different transmissions. For example, the UE may need to know which reference signals it can use to estimate the channel in order to decode a transmitted signal (e.g., physical downlink control channel (PDCCH) or physical downlink shared channel (PDSCH)). It may also be important for the UE to be able to report relevant channel state information (CSI) to the base station (BS) (e.g., gNB) for scheduling, link adaptation, and/or beam management purposes. In new radio (NR), the concept of quasi co-location (QCL) and transmission configuration indicator (TCI) states is used to convey information about these assumptions.

QCL assumptions are generally defined in terms of channel properties. 3GPP TS 38.214 defines QCL as follows: two antenna ports are said to be quasi-co-located if properties of the channel over which a symbol on one antenna port is conveyed can be inferred from the channel over which a symbol on the other antenna port is conveyed. Different reference signals (RSs) may be considered quasi co-located ("QCL'd") if a receiver (e.g., a UE) can apply channel properties determined by detecting a first reference signal to help detect a second reference signal. TCI states generally include configurations such as QCL-relationships, for example, between the downlink (DL) RSs in one CSI-RS set and the PDSCH demodulation reference signal (DMRS) ports.

In some cases, a UE may be configured with up to M TCI-States. Configuration of the M TCI-States may be via higher layer signaling. A UE may be signalled to decode PDSCH according to a detected PDCCH with downlink control information (DCI) indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

QCL signaling may be provided for RSs and channels across scenarios involving multiple cells such as coordinated multipoint (CoMP) scenarios in which multiple transmit receive points (TRPs) or integrated access and backhaul (IAB) nodes each have their own cell ID.

QCL types indicated to the UE can be based on a higher layer parameter QCL-Type and may take one or a combination of the following types:
QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter},
Spatial QCL assumptions (QCL-TypeD) may be used to help a UE to select an analog Rx beam (e.g., during beam management procedures). For example, a synchronizations signal block (SSB) resource indicator may indicate a same beam for a previous reference signal should be used for a subsequent transmission.

A TCI state may indicate which RS are QCL'd and the QCL type. The TCI state may also indicate a serving cell index (e.g., ServCellIndex) that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

FIG. 7 is a table 700 illustrating examples of the association of DL reference signals with corresponding QCL types that may be indicated by a parameter (e.g., TCI-RS-SetConfig). The table 700 shows source RSs, target RSs, and QCL type assumptions that may be configured for the source and target RSs. The target signal generally refers to a signal for which channel properties may be inferred by measuring those channel properties for the associated source signal. As noted above, a UE may use the source RS to determine various channel parameters, depending on the associated QCL type, and use those various channel properties (determined based on the source RS) to process the target signal. Examples of source RSs include phase tracking reference signals (PTRSs), SSBs, and/or CSI-RSs (e.g., CSI-RS for beam management). Examples of target RSs include aperiodic TRSs, periodic TRSs, PDCCHs, and/or PDSCHs. The QCL types include the QCL types A/B/C/D discussed above. As illustrated in FIG. 7, for the case of two source RSs, different QCL types can be configured for the same target RS. In the illustrative example, SSB is associated with Type C QCL for P-TRS, while CSI-RS for beam management (CSI-RS-BM) is associated with Type D QCL.

Figure 8:
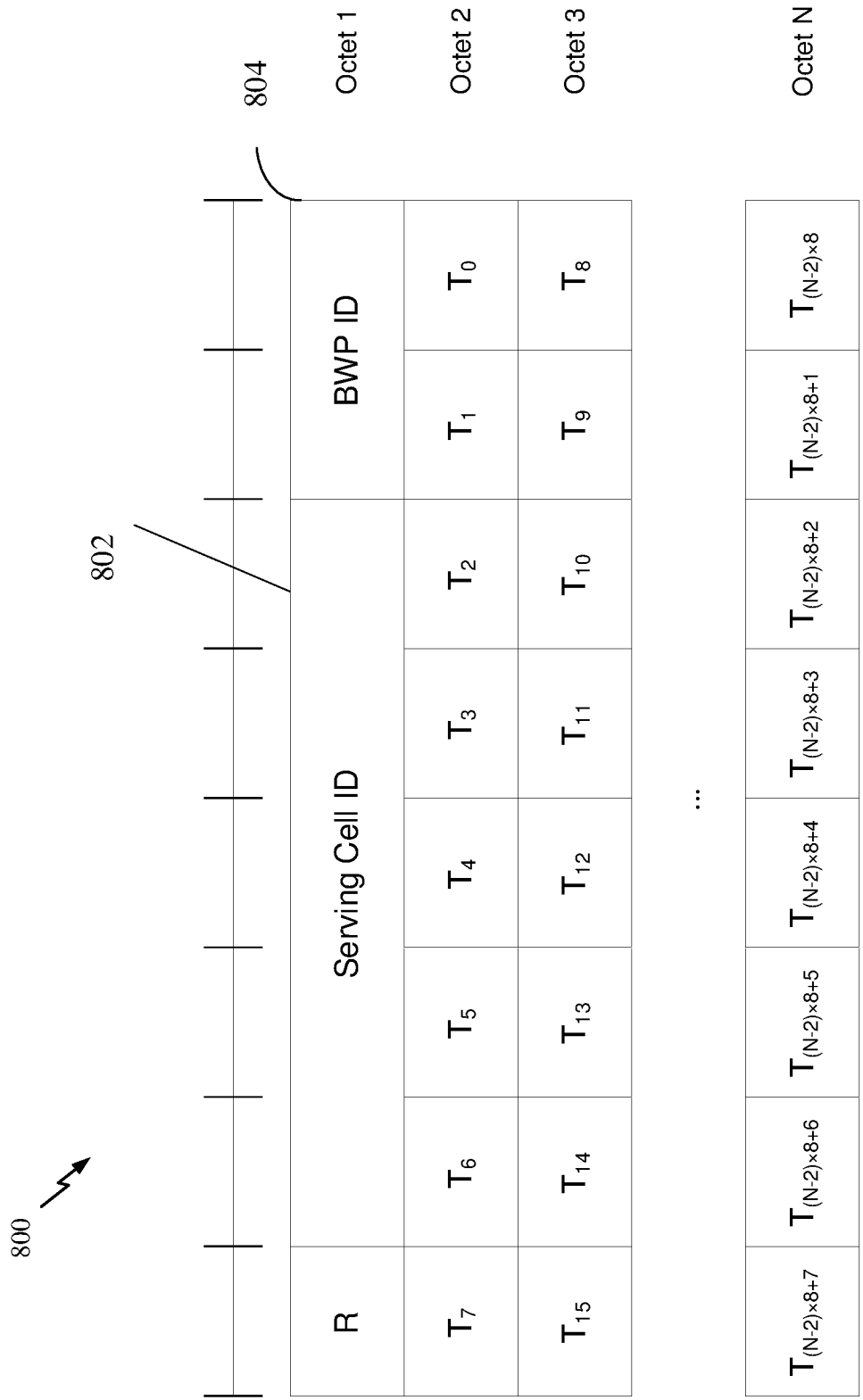
FIG. 8 illustrates an example medium access control (MAC) control element (MAC-CE) format for activating or deactivating transmission control information (TCI) states for a UE-specific physical channel, in accordance with certain aspects of the present disclosure.

FIG. 8 illustrates an example medium access control (MAC) control element (CE) format 800 for activating or deactivating TCI-states for a UE-specific PDSCH, in certain systems (e.g., in a Release 15 system). The MAC-CE format 800 includes a Serving Cell ID field 802 (e.g., is five bit field). The Serving Cell ID field 802 may indicate the identity of the serving cell for which the MAC-CE applies. The MAC-CE format 800 includes a bandwidth part (BWP) ID field 804 (e.g., a two bit field). The BWP ID field 804 may indicate a DL BWP for which the MAC-CE applies as the code point of the DCI (e.g., the bandwidth part indicator field as specified in TS 38.212). The MAC-CE format 800 may include bits indicating TCI states for the serving cell ID and BWP ID. For each bit, $T_i$, if there is a TCI state with a corresponding TCI state (e.g., a TCI-StateId i as specified in TS 38.331), then the corresponding $T_i$ field indicates the activation or deactivation status of the TCI state, otherwise, the MAC entity ignores the $T_i$ field. The $T_i$ field can be set to 1 to indicate that the TCI state with TCI-StateId i is activated and mapped to the code point of the DCI (e.g., the TCI field as specified in TS 38.214). The $T_i$ field can be set to 0 to indicate that the TCI state is deactivated and is not mapped to the code point of the DCI. The code point to which the TCI State is mapped may be determined by its ordinal position among all the TCI states with $T_i$ field set to 1. For example, the first TCI State with $T_i$ field set to 1 may be mapped to the code point value 0, the second TCI State with $T_i$ field set to 1 mapped to the code point value 1, and so on. In some examples, the maximum number of activated TCI states may be 8.

Figure 9:
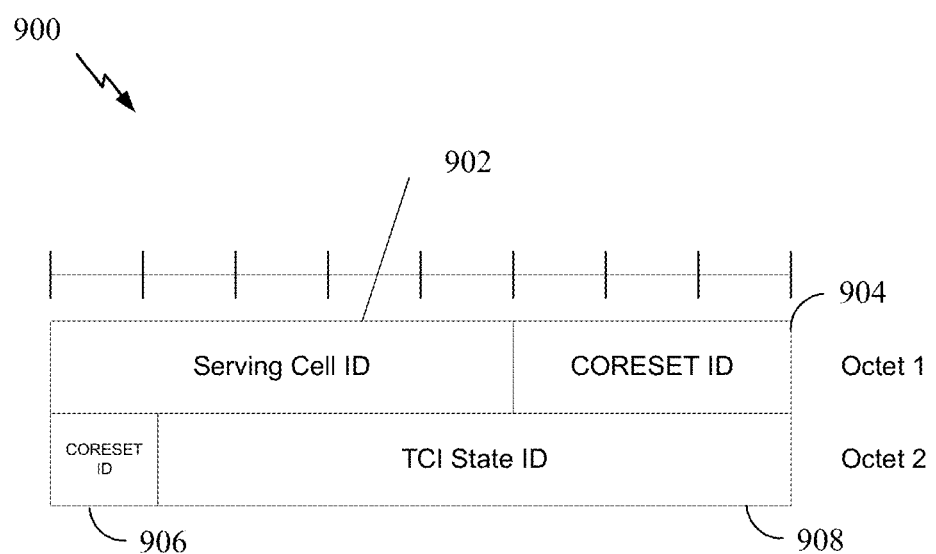
FIG. 9 illustrates another example MAC-CE for activating or deactivating a TCI state for a physical downlink control channel (PDCCH), in accordance with certain aspects of the present disclosure.

FIG. 9 illustrates another example MAC-CE format 900 for activating or deactivating a TCI-state for a PDCCH. As shown, the MAC-CE format 900 may include the Serving Cell ID field 902 (e.g., five bits) that indicates the identity of the serving cell for which the MAC-CE applies. The MAC-CE format 900 may include a control resource set (CORESET) ID field (e.g., a four bits field, which may include a last three bits 904 of the first octet and a first bit 906 of the second octet). The CORESET ID field may indicate a CORESET (e.g., a ControlResourceSetId as specified in TS 38.331), for which the TCI State is being indicated. If the value of the field is 0, then the field may refer to a first control resource set (e.g., configured by controlResource-SetZero as specified in TS 38.331). The MAC-CE format 900 may include a TCI State ID field 908 (e.g., seven bits). The TCI State ID field 908 may indicate the TCI state applicable to the CORESET identified by the CORESET ID field. If the value of the CORESET ID field is set to 0, then the TCI State ID field indicates a TCI state of the first 64 TCI states configured (e.g., by tci-States-ToAddModList and tci-States-ToReleaseList in the PDSCH-Config) in the active BWP. Otherwise, the TCI State ID field indicates another TCI state (e.g., configured by tci-StatesPDCCH-ToAddList and tci-StatesPDCCH-ToReleaseList) in the CORESET identified by the indicated CORESET ID.

Generally, to update a TCI state, each UE receives a unicast PDSCH via RRC and/or MAC-CE). The unicast PDSCH may be scheduled by a PDCCH and may be scrambled by a UE ID. However, multiple of the (e.g., each) unicast PDSCH may carry the same information to update the TCI state. The signalling overhead for the TCI state indication and update may be large.

Aspects of the present disclosure relate to techniques for sending an indication of a common beam for communicating between a network entity and a group of UEs.

Example Indication of Common Beam for Multiple UEs

The techniques presented herein may help reduce signaling overhead and/or latency by sending an indication of a common beam to a plurality of user equipment (UEs) using groupcast signaling rather than unicast signaling. In some cases, signaling overhead/latency may be even further reduced by applying a beam update of information using the common beam across multiple component carriers (CCs) and/or bandwidth parts (BWPs).

The techniques presented herein may be used in a variety of scenarios, such as for Internet of Things (IoT) or industrial IoT (IIoT). In an illustrative example, a common beam indication may be used for an IIoT system operating on the frequency bands from 24.25 GHz to 52.6 GHz (e.g., referred to as frequency range 2 or FR2). In another illustrative example, a common beam indication may be used where multiple UEs share the same quasi co-location type (QCL-Type) (e.g., the QCL-TypeA, QCL-TypeB, and/or QCL-TypeC described above) on a sub-6 GHz frequency band (e.g., referred to as FR1).

Figure 10:
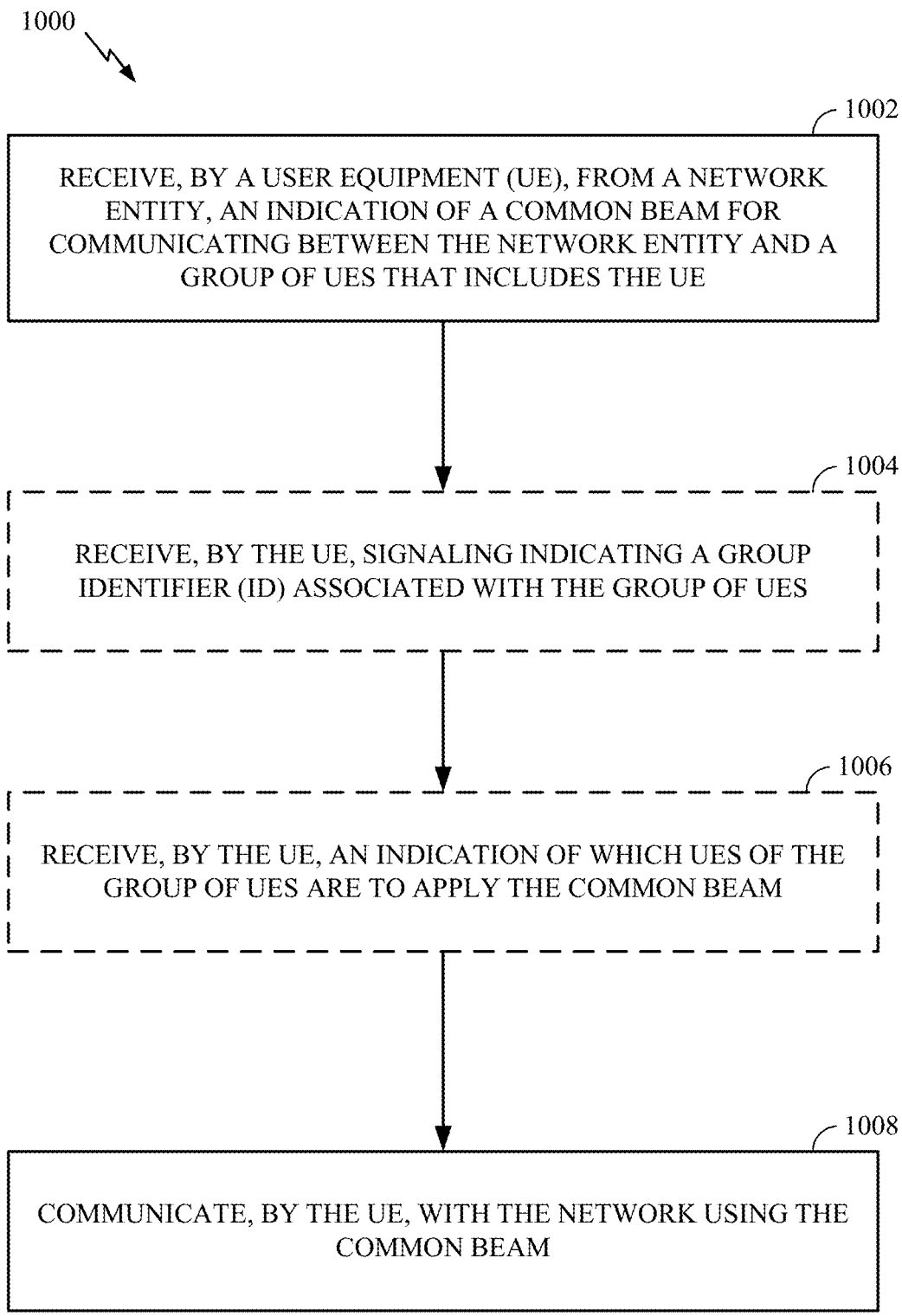
FIG. 10 is a flow diagram illustrating example operations for wireless communications by a UE, in accordance with aspects of the present disclosure.

FIG. 10 illustrates example operations 1000 for wireless communications by a UE, in accordance with aspects of the present disclosure. Operations 1000 may be performed, for example, by a UE 120 of FIG. 1, to receive (groupcast) an indication of a common beam (shared by multiple UEs). The operations 1000 may be implemented as software components that are executed and run on one or more processors (e.g., controller/processor 480 of FIG. 2). Further, the transmission and reception of signals by the UE in operations 1000 may be enabled, for example, by one or more antennas (e.g., antennas 452 of FIG. 2). In certain aspects, the transmission and/or reception of signals by the UE may be implemented via a bus interface of one or more processors (e.g., controller/processor 480) obtaining and/or outputting signals.

Operations 1000 begin, at 1002, by receiving, from a network entity, an indication of a common beam for communicating between the network entity and a group of UEs that includes the UE. The indication of the common beam may be groupcasted to the group of UEs. In some aspects, at 1004, the UE may receive signaling indicating a group identifier (ID) associated with the group of UEs, and at 1006, the UE may receive an indication of which UEs in the group of UEs are the apply the common beam.

At 1008, the UE communicates with the network using the common beam. In some aspects, communication between the UE and the network may include a transmission control information (TCI) beam change for the group of UEs using the common beam. Communication between the UE and the network may include sending an update of information via the common beam.

Figure 11:
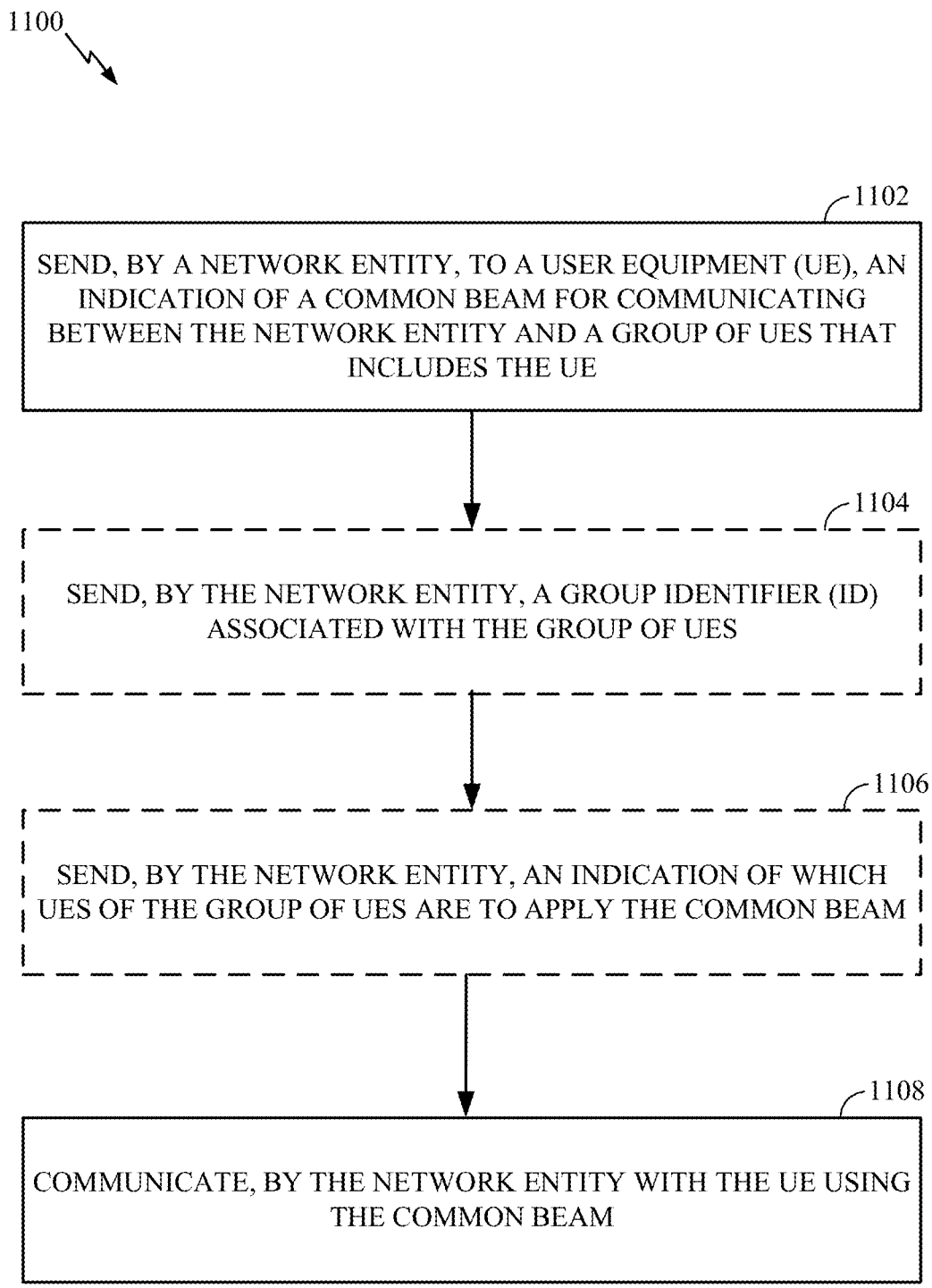
FIG. 11 is a flow diagram illustrating example operations for wireless communications by a network entity, in accordance with aspects of the present disclosure.

FIG. 11 illustrates example operations 1100 for wireless communications by a network entity, in accordance with aspects of the present disclosure. For example, operations 1100 may be performed by a base station 110 to efficiently signal a common update for a UE to apply across multiple CCs (e.g., to a UE performing operations 1200 of FIG. 12). The operations 1100 may be implemented as software components that are executed and run on one or more processors (e.g., controller/processor 240 of FIG. 2). Further, the transmission and reception of signals by the BS in operations 1100 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

Operations 1100 begin, at 1102, by sending, to a UE, an indication of a common beam for communicating between the network entity and a group of UEs that includes the UE. The network entity may groupcast the indication of the common beam to the group of UEs. In some aspects, at 1104, the network entity may send signaling indicating an ID associated with the group of UEs, and at 1106, the UE may receive an indication of which UEs in the group of UEs are the apply the common beam.

At 1108, the network entity communicates with the UE using the common beam. In some aspects, communication between the UE and the network entity may include a TCI beam change for the group of UEs using the common beam. Communication between the UE and the network entity may include sending an update of information via the common beam.

As noted above, operations 1000 and 1100 may help reduce overhead and/or latency by effectively utilizing groupcast signaling, rather than unicast signaling, to signal operations using a common beam (to update beam information) for a group of UEs.

Aspects of the present disclosure involve sending, to one or more UEs, an indication of a common beam to update each UE's TCI state. The indication of the common beam may be signalled to the multiple UEs via radio resource control (RRC) signaling, a medium access control (MAC) control element (MAC-CE), or a downlink control information (DCI). In some examples, the network (e.g., gNB) may identify the UEs that are to apply the TCI update via a list of UE IDs or by a configured or pre-configured group ID for the group of UEs. In some examples, to enable indication of a TCI beam change and/or update for a group of UEs, the network may send the indication of the common beam in a physical downlink control channel (PDCCH) scrambled by a group ID, or in a physical downlink shared channel (PDSCH) scheduled by a PDCCH scrambled by group ID.

In the groupcast PDCCH or PDSCH, the network may send the indication of a common beam to the UEs in the group of UEs (e.g., based on the assigned group ID). In some examples, the network may send an indication of which UEs (in the group of UEs) are to apply common beam. In some aspects, the indication of the common beam may be for a beam update.

As mentioned, the network may provide an indication to the UEs about the formation of the group and their assigned group ID. In some examples, after receiving an indication of the group ID, a UE may attempt blind decodes of PDCCH, using its own UE ID and/or its group ID to de-scramble.

According to certain aspects, the groupcast signaling mechanism provided herein may be applied for a variety of different types of updates to a common beam.

In some examples, for PDSCH processing, the groupcast signaling may allow an activated TCI state ID(s) on a BWP of a CC to be applied to multiple UEs for a same BWP on the same CC. Similarly, for PDCCH processing, the groupcast signaling may allow the activated TCI state ID for a control resource set (CORESET) ID on a CC to be applied to multiple UEs for the same CORESET ID on the same CC.

In some examples for channel state information reference signal (CSI-RS) processing, the groupcast signaling may allow the activated TCI state ID per CSI-RS resource ID on a CC to be applied to multiple UEs for same CSI-RS resource ID on same CC.

In some examples for physical uplink control channel (PUCCH) processing and/or sounding reference signal (SRS) processing, the groupcast signaling may allow the activated spatial relation per PUCCH and/or SRS resource ID on a BWP of a CC to be applied to multiple UEs for same PUCCH and/or SRS resource ID on same BWP of same CC.

In some examples, for PUCCH processing, SRS processing, physical uplink shared channel (PUSCH) processing, and/or physical random access channel (PRACH) processing, the groupcast signaling may allow the activated uplink (UL) TCI state per PUCCH, SRS, PUSCH, and/or PRACH resource ID on a BWP of a CC to be applied to multiple UEs for same PUCCH, SRS, PUSCH, and/or PRACH resource ID on same BWP of same CC.

As noted above, in some cases, the activated beam(s) may be applied to all BWPs on all CCs in a CC list for a UE if a CC list is configured for the UE.

In some cases, a TCI state list may be defined in a per CC and/or per BWP manner, and the update indication of the TCI state may also be per CC and/or per BWP.

Considering multiple CCs in the same frequency band may share a same TCI beam, in some examples, CCs may be grouped in a CC list and/or group. In such cases, the TCI state list and indication to update the list may be shared for all CCs in the CC list and/or group. This approach may be applied to the groupcast signaling of beam updates proposed herein. For example, in some cases, a CC ID may be indicated in the (groupcast signaled) indication of the common beam. In some cases, a CC ID for a CC group and/or list may be indicated in the (groupcast signaled) indication of the common beam. In such cases, the UE (or the group of UEs) may receive the list of CCs via the indication of the common beam and may apply the common beam across all CCs in the CC group and/or list (and/or all BWPs in the list of CCs).

In some cases, a UE may receive RRC signaling of multiple lists of CCs. In such cases, the UE may determine which list of CCs to apply the update across. For example, the UE may determine one or more list of CCs to which to apply the common beam based on an indication provided with the indication of the common beam or based on a CC in which the indication of the common beam is received.

Figure 12:
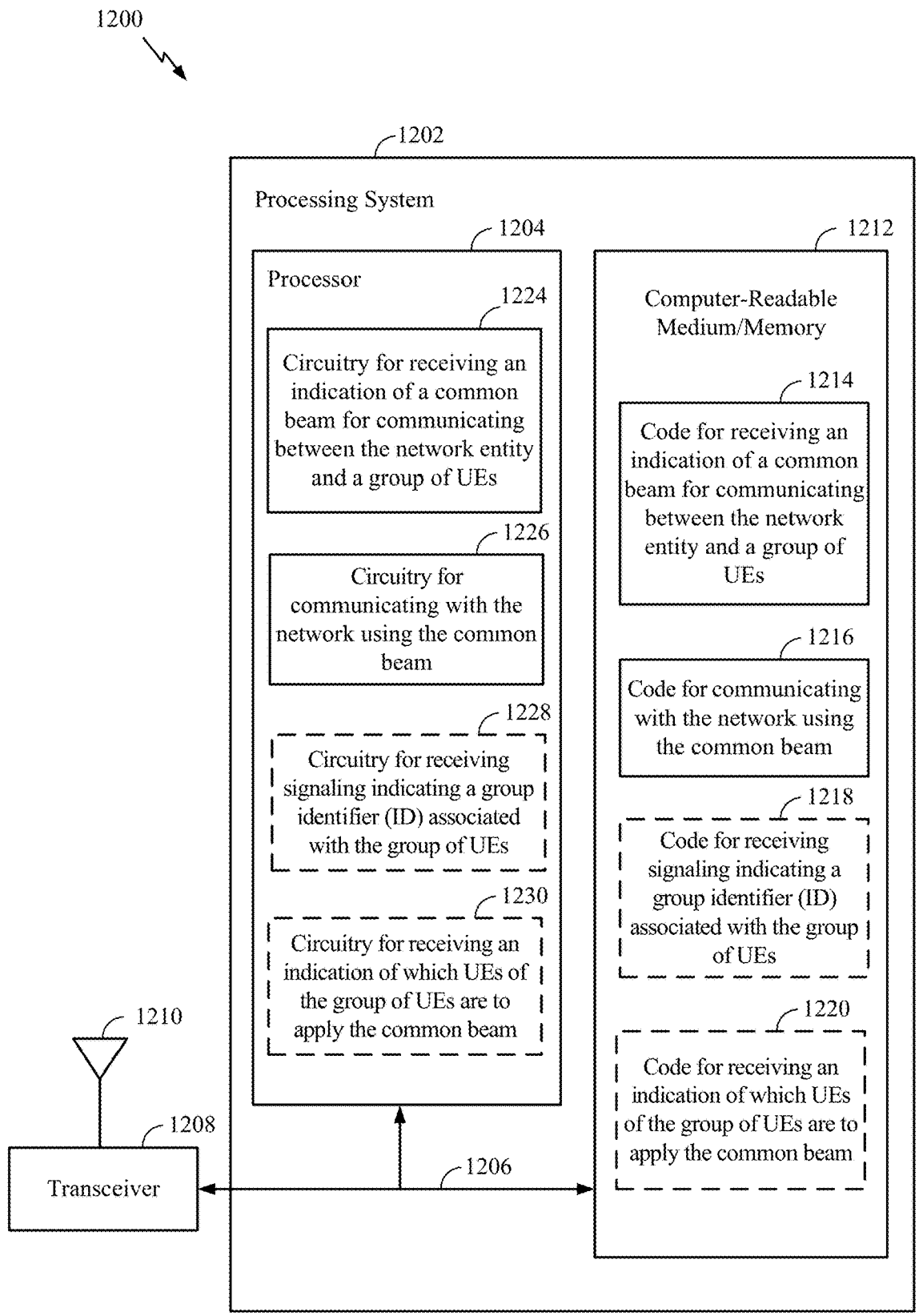
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for performing the various techniques discussed herein for indicating an update of information for a common beam for communicating between a network entity and a group of UEs. In certain aspects, computer-readable medium/memory 1212 stores code 1214 for receiving, from a network entity, an indication of a common beam for communicating between the network entity and a group of UEs that includes the UE; and code 1216 for communicating with the network using the common beam. In certain aspects, computer-readable medium/memory 1212 may store code 1218 for receiving signaling indicating a group identifier (ID) associated with the group of UEs, and/or code 1220 for receiving an indication of which UEs of the group of UEs are to apply common beam. In certain aspects, the processor 1204 has circuitry configured to implement the code stored in the computer-readable medium/memory 1212. The processor 1204 includes circuitry 1224 for receiving, from a network entity, an indication of a common beam for communicating between the network entity and a group of UEs that includes the UE; and circuitry 1226 for communicating with the network using the common beam. In certain aspects, the processor 1204 may include circuitry 1228 for receiving signaling indicating a group identifier (ID) associated with the group of UEs and/or circuitry 1230 for receiving an indication of which UEs of the group of UEs are to apply the common beam.

For example, means for receiving (or means for obtaining) may include a receiver and/or antenna(s) 252 of the UE 120a illustrated in FIG. 2 and/or circuitry 1224 for receiving an indication of a common beam for communicating between the network and a group of UEs of the communication device 1200 in FIG. 12. Means for transmitting (or means for outputting for transmission) may include a transmitter unit 254 and/or antenna(s) 252 of the UE 120a illustrated in FIG. 2 and/or circuitry 1226 for communicating with the network using the common beam of the communication device 1300 in FIG. 12. Means for communicating may include a transmitter, a receiver or both. Means for generating, means for performing, means for determining, means for taking action, means for determining, means for coordinating may include a processing system, which may include one or more processors, such as the receive processor 258, the transmit processor 264, the TX MIMO processor 266, and/or the controller/processor 280 of the UE 120a illustrated in FIG. 2 and/or the processing system 1202 of the communication device 1200 in FIG. 12.

Figure 13:
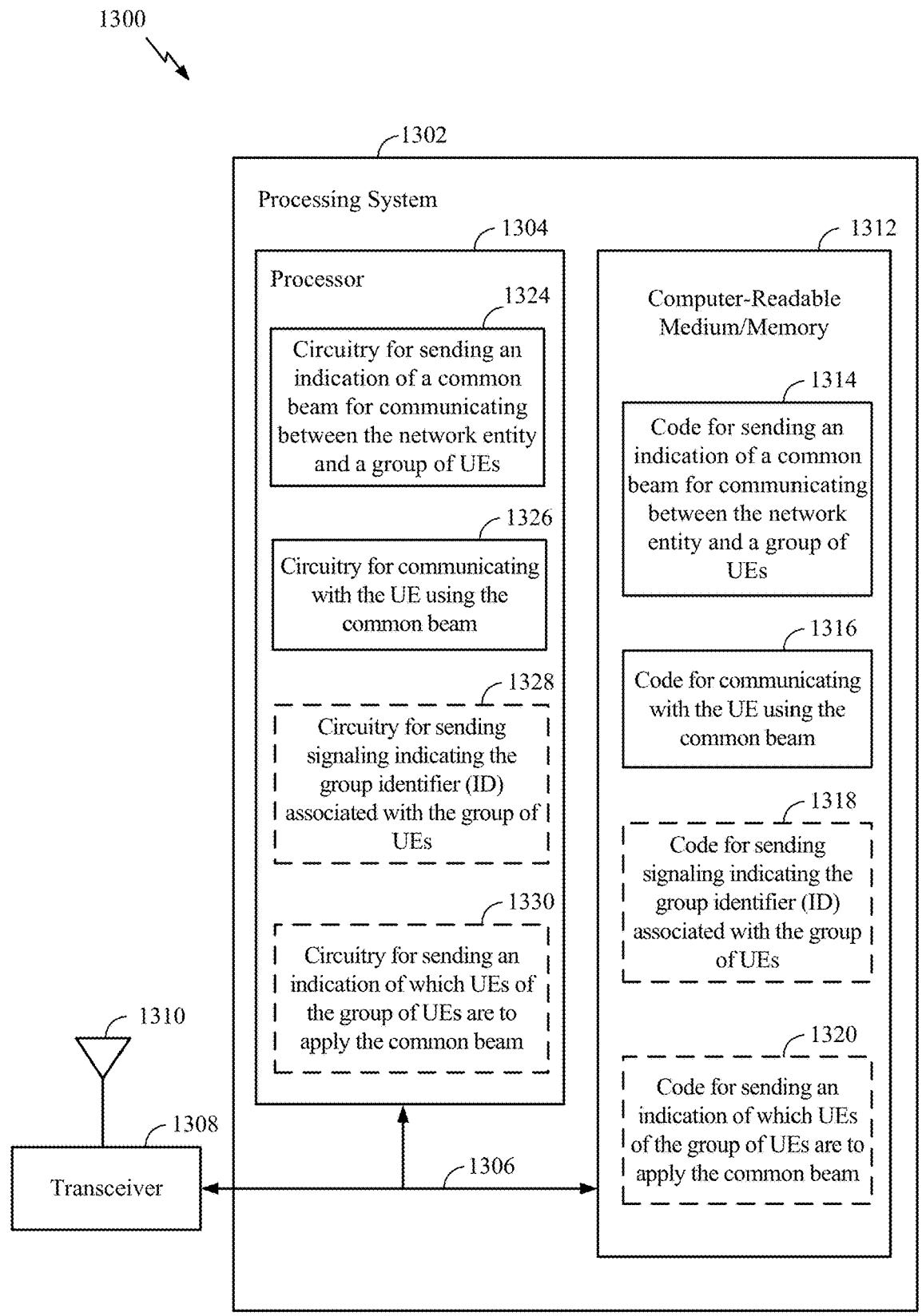
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIG. 11. The communications device 1300 includes a processing system 1302 coupled to a transceiver 508 (e.g., a transmitter and/or a receiver). The transceiver 1308 is configured to transmit and receive signals for the communications device 1300 via an antenna 1310, such as the various signals as described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions (e.g., computer-executable code) that when executed by the processor 1304, cause the processor 1304 to perform the operations illustrated in FIG. 11, or other operations for performing the various techniques discussed herein for indicating an update of information for a common beam for communicating between a network entity and a group of UEs. In certain aspects, computer-readable medium/memory 1312 stores code 1314 for sending, to a UE, an indication of a common beam for communication between the network entity and a group of UEs that includes the UE; and code 1316 for communicating with the UE using the common beam. In certain aspects, computer-readable medium/memory 1312 may store code 1318 for sending signaling indicating the group ID associated with the group of UEs, and/or code 1320 for sending an indication of which UEs of the group of UEs are to apply the common beam. In certain aspects, the processor 1304 has circuitry configured to implement the code stored in the computer-readable medium/memory 1312. The processor 1304 includes circuitry 1324 for sending, to a UE, an indication of a common beam for communicating between the network entity and a group of UEs that includes the UE; and circuitry 1326 for communicating with the UE using the common beam. In certain aspects, processor 1304 may include circuitry 1328 for sending signaling indicating the group ID associated with the group of UEs, and/or circuitry 1330 for sending an indication of which UEs of the group of UEs are to apply the common beam.

For example, means for receiving (or means for obtaining) may include a receiver and/or an antenna(s) 234 of the BS 110a illustrated in FIG. 2 and/or circuitry 1326 of device 1300 in FIG. 13. Means for transmitting (or means for outputting for transmission) may include a transmitter and/or an antenna(s) 234 or the BS 110a illustrated in FIG. 2 and/or circuitry 1324 for sending an indication of a common beam of the communication device 1300 in FIG. 13. Means for communicating may include a transmitter, a receiver or both. Means for generating, means for performing, means for determining, means for taking action, means for determining, means for coordinating may include a processing system, which may include one or more processors, such as the transmit processor 220, the TX MIMO processor 230, the receive processor 238, and/or the controller/processor 240 of the BS 110a illustrated in FIG. 2 and/or the processing system 1302 of the communication device 1300 in FIG. 13.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10 and/or FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving, from a network entity, signaling indicating a group identifier (ID) associated with a group of UEs including the UE, wherein the group ID is associated with groupcast signaling;
   attempting to decode downlink transmissions using both an ID of the UE and the group ID;
   receiving, from the network entity, an indication of a common beam for communicating between the network entity and the group of UEs that includes the UE; and
   communicating with the network entity using the common beam.

2. The method of claim 1, wherein the indication of the common beam is signaled via at least one of: a physical downlink control channel (PDCCH) scrambled with the group ID, a physical downlink shared channel (PDSCH) scrambled with the group ID, or a PDSCH that is scheduled by a PDCCH scrambled with the group ID.

3. The method of claim 1, wherein the indication of the common beam is for a beam update.

4. The method of claim 1, further comprising receiving an indication of which UEs of the group of UEs are to apply the common beam.

5. The method of claim 1, wherein receiving the indication of the indication comprises receiving the indication of the common beam via at least one of radio resource control (RRC) signaling, media access control (MAC) control element (CE), or a downlink control information (DCI).

6. The method of claim 1, further comprising: receiving an update of information via a common beam used for communicating between the network entity and the group of UEs.

7. The method of claim 1, wherein the indication comprises an activated transmission configuration indication (TCI) state identifier (ID).

8. The method of claim 7, wherein:
   the activated TCI state ID is received on a bandwidth part (BWP) of a component carrier (CC); and
   communicating with the network entity using the common beam includes using the activated TCI state ID for physical downlink shared channel (PDSCH) transmissions on the BWP.

9. The method of claim 7, wherein:
   the activated TCI state ID is for a control resource set (CORESET) ID on a component carrier; and
   communicating with the network entity using the common beam includes using the activated TCI state ID for physical downlink control channel (PDCCH) transmissions for the CORESET ID on the CC.

10. The method of claim 7, wherein:
    the activated TCI state ID is for a channel state information reference signal (CSI-RS) ID on a component carrier; and communicating with the network entity using the common beam includes using the activated TCI state ID to process CSI-RS of the CSI-RS ID on the CC.

11. The method of claim 7, wherein:
the activated TCI state ID is for at least one of a physical uplink control channel (PUCCH), sounding reference signal (SRS), physical uplink shared channel (PUSCH), or physical random access channel (PRACH) resource ID on a bandwidth part (BWP) of a component carrier (CC); and
communicating with the network entity using the common beam includes using the activated TCI state ID for an uplink transmission of the resource ID on the same BWP of the same CC.

12. The method of claim 1, further comprising receiving a list of component carriers (CCs) via radio resource control (RRC) signaling to apply the common beam.

13. The method of claim 12, wherein:
the RRC signaling indicates multiple lists of CCs; and
the method further comprises determining which list of CCs to apply the common beam based on another indication provided with the indication of the common beam or based on a CC in which the indication of the common beam is received.

14. A method for wireless communications by a network entity, comprising:
sending, to a user equipment (UE), signaling indicating a group identifier (ID) associated with a group of UEs that includes the UE, the group ID and an ID of the UE used by the UE to decode downlink transmission from the network entity, wherein the group ID is associated with groupcast signaling;
sending, to the UE, an indication of a common beam for communicating between the network entity and the group of UEs that includes the UE; and
communicating with the UE using the common beam.

15. The method of claim 14,
wherein the indication of the common beam is sent via at least one of a physical downlink control channel (PDCCH) scrambled with the group ID, a physical downlink shared channel (PDSCH) scrambled with the group ID, or a PDSCH that is scheduled by a PDCCH scrambled with the group ID.

16. The method of claim 14, wherein the indication of the common beam is for a beam update.

17. The method of claim 14, further comprising sending an indication of which UEs of the group of UEs are to apply the common beam.

18. The method of claim 14, wherein sending the indication comprising sending the indication via at least one of radio resource control (RRC) signaling, media access control (MAC) control element (CE), or a downlink control information (DCI).

19. The method of claim 14, further comprising sending an update of information via the common beam used for communicating between the network entity and the group of UEs.

20. The method of claim 14, wherein the indication comprises an activated transmission configuration indication (TCI) state identifier (ID).

21. The method of claim 20, wherein:
the activated TCI state ID is signaled on a bandwidth part (BWP) of a component carrier (CC); and
communicating with the UE using the common beam includes using the activated TCI state ID for physical downlink shared channel (PDSCH) transmissions on the BWP.

22. The method of claim 20, wherein:
the activated TCI state ID is for a control resource set (CORESET) ID on a component carrier; and
communicating with the UE using the common beam includes using the activated TCI state ID for physical downlink control channel (PDCCH) transmissions for the CORESET ID on the CC.

23. The method of claim 20, wherein:
the activated TCI state ID is for a channel state information reference signal (CSI-RS) ID on a component carrier; and
communicating with the UE using the common beam includes using the activated TCI state ID to process CSI-RS of the CSI-RS ID on the CC.

24. The method of claim 19, further comprising sending the update as an uplink transmission configuration indication (TCI) state identifier (ID) for one or more types of uplink transmissions.

25. The method of claim 24, wherein:
the TCI state ID is for at least one of a physical uplink control channel (PUCCH), sounding reference signal (SRS), physical uplink shared channel (PUSCH), or physical random access channel (PRACH) resource ID on a bandwidth part (BWP) of a component carrier (CC); and
communicating with the UE using the common beam includes using the TCI state ID for an uplink transmission of the resource ID on the same BWP of the same CC.

26. The method of claim 14, further comprising indicating a list of component carriers (CCs) via radio resource control (RRC) signaling to apply the common beam.

27. The method of claim 26, wherein:
the RRC signaling indicates multiple lists of CCs; and
determining which list of CCs to apply the common beam based on another indication provided with the indication of the common beam or based on a CC in which the indication of the common beam is received.

28. An apparatus for wireless communications, comprising:
at least one processor; and
a memory coupled to the at least one processor, the memory comprising code executable by the at least one processor to cause the apparatus to:
receive, from a network entity, signaling indicating a group identifier (ID) associated with a group of user equipments (UEs) including the apparatus, wherein the group ID is associated with groupcast signaling;
attempt to decode downlink transmissions using both an ID of the apparatus and the group ID;
receive, from the network entity, an indication of common beam for communicating between the network entity and the group of user equipments (UEs) that includes the apparatus, wherein the group ID is associated with groupcast signaling; and
communicating with the network entity using the common beam.

29. An apparatus for wireless communications by a network entity, comprising:
at least one processor; and
a memory coupled to the at least one processor, the memory comprising code executable by the at least one processor to cause the apparatus to:
send, to a user equipment (UE), signaling indicating a group identifier (ID) associated with a group of UEs that includes the UE, the group ID and an ID of the UE used by the UE to decode downlink transmission from the network entity, wherein the group ID is associated with groupcast signaling;

send, to the UE, an indication of a common beam for communicating between the network entity and the group of UEs that includes the UE; and communicate with the UE using the common beam.

30. The method of claim 1, wherein the receiving, from the network entity, the indication of the common beam for communicating between the network entity and the group of UEs that includes the UE is based on the UE attempting to decode the downlink transmissions.

31. The apparatus of claim 28, wherein the code executable by the at least one processor to cause the apparatus to receive, from the network entity, the indication of the common beam for communicating between the network entity and the group of UEs that includes the apparatus is based on the apparatus attempting to decode the downlink transmissions.

* * * * *